United States Patent [19]

Caserta et al.

[11] Patent Number: 5,121,045
[45] Date of Patent: Jun. 9, 1992

[54] EMI PROOF BATTERY PACK FOR NIGHT VISION GOGGLES

[75] Inventors: Joseph N. Caserta; David A. Crenshaw, both of Roanoke, Va.

[73] Assignee: ITT Corporation, New York, N.Y.

[21] Appl. No.: 609,991

[22] Filed: Nov. 7, 1990

[51] Int. Cl.⁵ .................. H05K 9/00; H01Q 17/00
[52] U.S. Cl. ..................................................... 320/13
[58] Field of Search ........................................ 320/13

[56] References Cited

U.S. PATENT DOCUMENTS

| | | | |
|---|---|---|---|
| 4,503,388 | 3/1985 | Zehl et al. | 324/77 |
| 4,724,357 | 2/1988 | Drinkwine | 313/524 |
| 4,902,126 | 2/1990 | Koechner | 356/5 |
| 4,924,080 | 5/1990 | Caserta et al. | 250/213 VT |

Primary Examiner—Steven L. Stephan
Assistant Examiner—Thomas M. Dougherty
Attorney, Agent, or Firm—Arthur L. Plevy; Patrick M. Hogan

[57] ABSTRACT

An improved battery pack for night vision goggles is employed in the cockpit of an aircraft, where RF fields of several hundred volts/meter are present. The improved battery pack includes a shunt circuit for shunting RF signals picked up by any external leads from the battery pack, and a resistor for dissipating electromagnetic energy from the RF signals shunted by the shunt circuit.

15 Claims, 4 Drawing Sheets

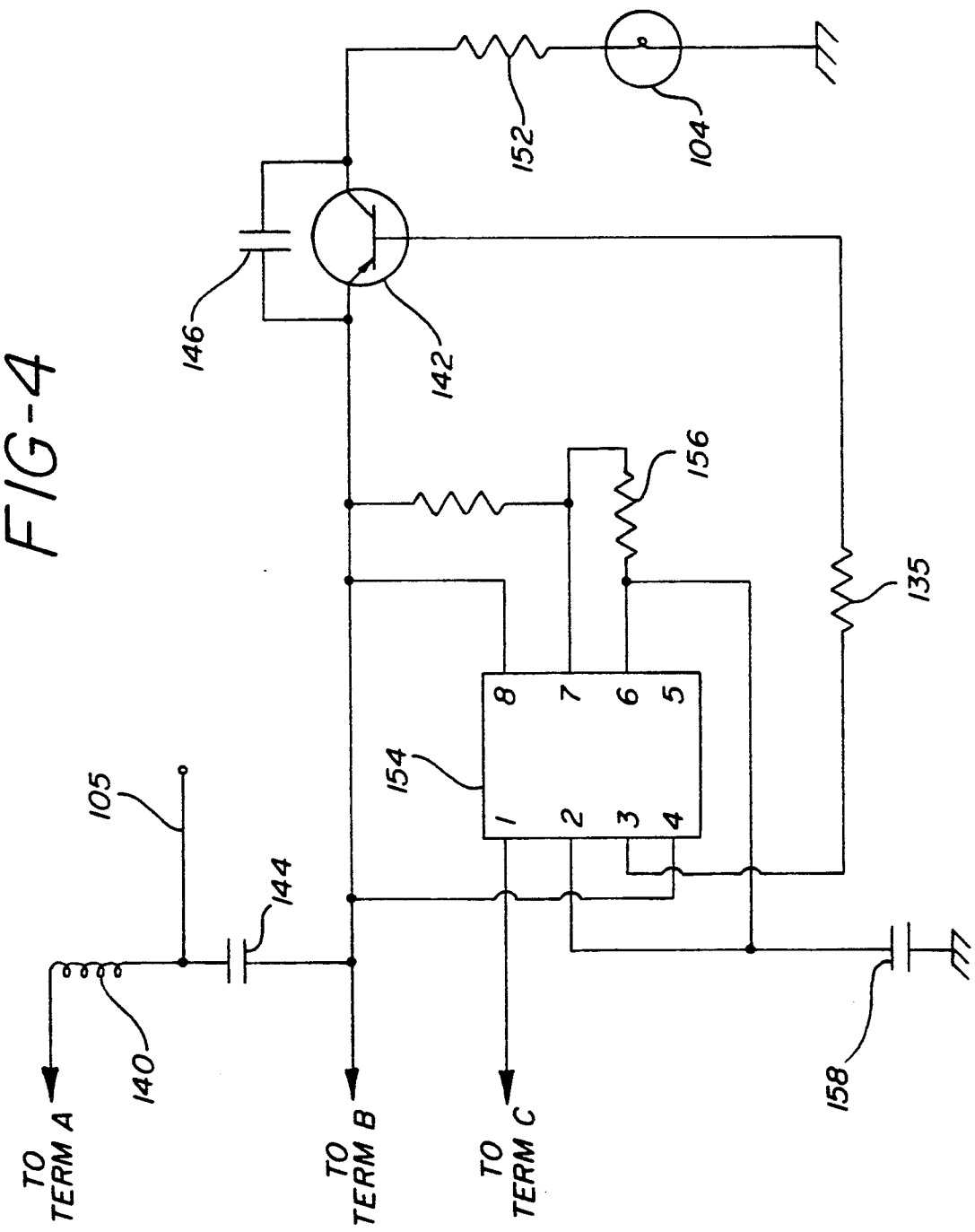

EMI PROOF BATTERY PACK FOR NIGHT VISION GOGGLES

BACKGROUND OF THE INVENTION

The present invention relates in general to a battery pack for night vision goggles, and in particular to an EMI-hardened battery pack that has a shunt circuit for protection against high-voltage RF signals.

Night vision goggles are well known for their ability to enhance night-time vision. The goggles employ intensifier devices which operate to multiply the incident light received to produce a display that is bright enough for presentation to the eyes of a viewer. For instance, the U.S. military uses night goggles during night-time operations to sight objects that otherwise would not be visible.

A typical arrangement for a night vision goggle system is shown in FIG. 1. The night goggles 1 are attached to the front of a helmet 2 such that they can be viewed by an operator 3. A battery pack 10, which provides the night goggles 1 with operating potential, is attached to the rear of the helmet 2. A light emitting diode (LED) 4, located on the night goggles 1 in clear view of the operator 3, indicates when the voltage provided by the battery pack 10 is at a low level. The voltage is supplied from the battery pack 10 to the night goggles 1 by a first conductor 5. The LED 4 is connected to a low battery indicator in the battery pack 10 by second and third conductors 6 and 7.

The night vision goggles 1 are routinely subjected to high RF fields (EMI radiation) in excess of several hundred volts/meter when used in military aircraft. These fields can be internally generated and/or be externally generated. Because the first, second and third conductors 5, 6 and 7 extend from the back of the helmet 2, around the side of the helmet and to the front of the helmet 2, they are exposed to these very high RF fields. The conductors 5, 6 and 7 behave as antennae and pick up these RF signals. When transmitted to the battery pack 10, the RF signals tend to affect the operation of the battery pack 10 and which, in turn, affects the operation of the night goggle system. These RF signals are of large magnitude and can destroy circuit components employed in the goggles.

It is very difficult to harden against electromagnetic interference when the battery pack is subjected to electromagnetic fields of 200 V/M or more. Normally two approaches are used: (1) Faraday Shield the entire goggle system; or (2) shunt all EMI signals to ground. The first approach, Faraday shielding, is not feasible. Even if the conductors were shielded, there would be some leakage in the shield and, as a result, the first, second and third conductors 5, 6 and 7 would pick up some RF signals. Furthermore, Faraday shielding the entire goggle system would require a major redesign of the entire system. The second approach, shunting to ground, is also not feasible since the battery pack does not have an effective ground plane. Any attempt to shunt EMI signals to ground would fail because a ground leg conductor would be as hot (EMI wise) as the other conductors 5, 6 and 7. Thus, filtering does not work very well at all.

Therefore, it is an object of the present invention to EMI harden the battery pack against RF signals without having to redesign the entire night vision goggle system.

SUMMARY OF THE INVENTION

The present invention relates to an improved battery pack for night vision goggles that are employed in the cockpit of an aircraft, where they may be subjected to RF fields of several hundred volts/meter. The battery pack has at least one external lead that picks up RF signals. However, the battery pack does not have an effective ground plane. The improvement in the battery pack comprises shunt means for shunting the RF signals picked up by any of the external leads; and dissipating means, coupled to an output of the shunt means, for dissipating electromagnetic energy of the RF signals provided on the output of the shunt means.

BRIEF DESCRIPTION OF THE DRAWINGS

FIG. 4 is a schematic diagram of an alternate embodiment of a shunt circuit in accordance with the present invention.

DETAILED DESCRIPTION OF THE EXEMPLARY EMBODIMENTS

Figure 1:
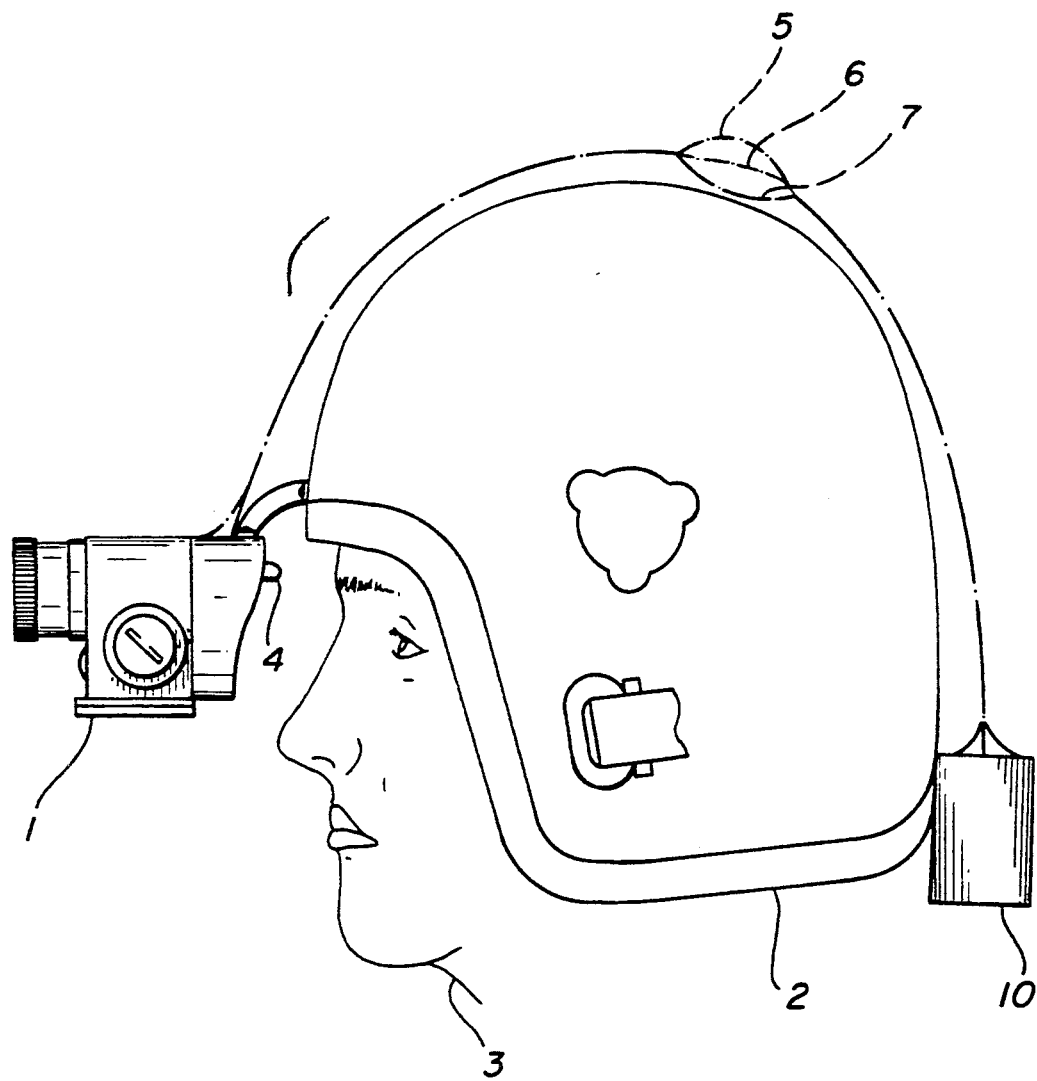
FIG. 1 is a schematic diagram of a typical arrangement for a night vision goggle system.

Referring once again to FIG. 1, the first, second and third conductors 5, 6 and 7 behave as antennae and pick up RF signals in high electromagnetic fields. Such RF signals are found, for instance, in the cockpit of a military aircraft which is in an EMI environment as including radar, communications equipment and other sources of radiation. These RF signals are conducted to the battery pack 10 of the night vision goggle system. The RF signals occur in the frequency range from 14 KHz to 40 GHz. Such systems are tested according to MIL STD 461 and 462 (14 KHz to 40 GHz).

Figure 2:
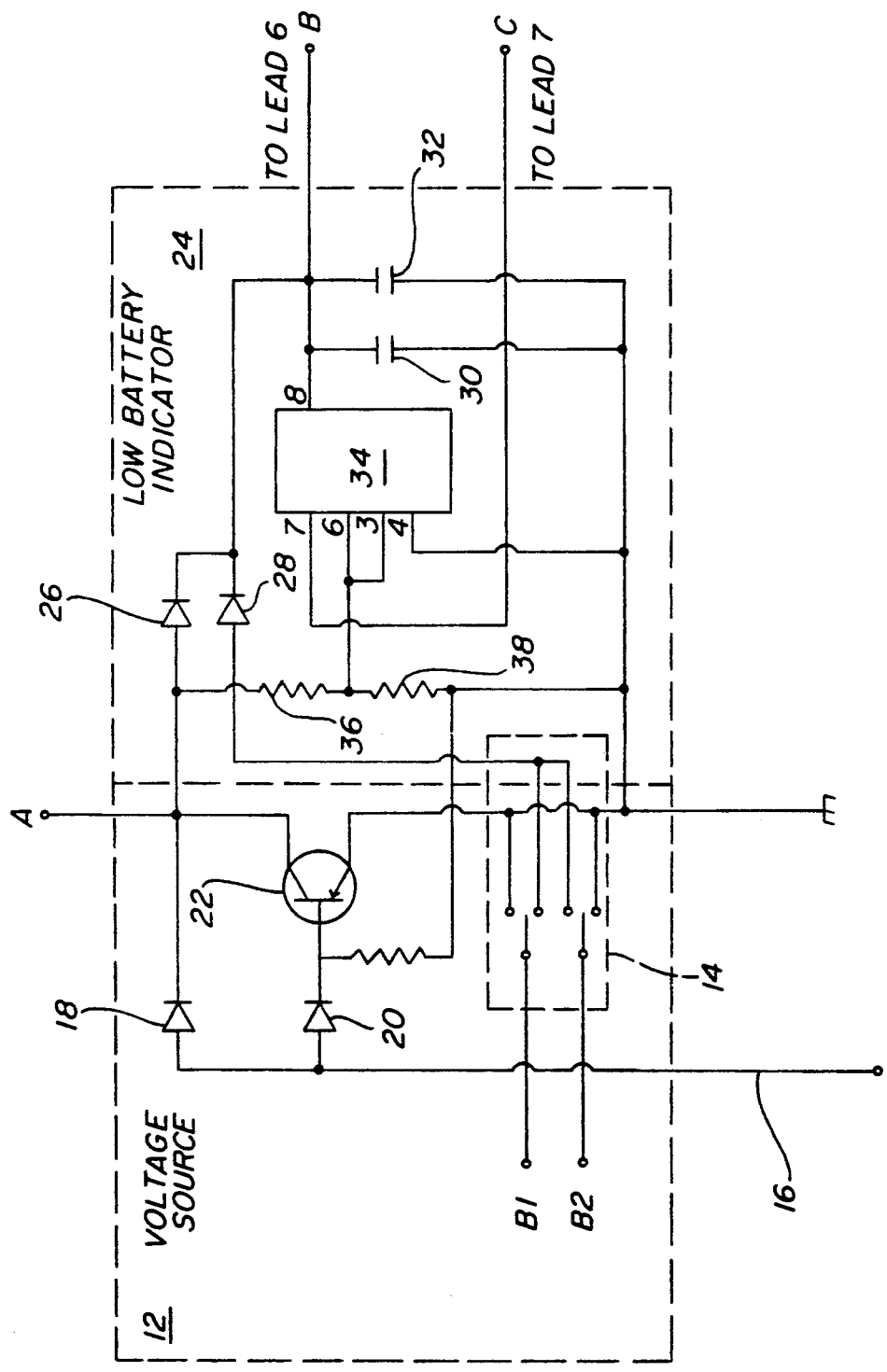
FIG. 2 is a schematic diagram of a voltage source and a low battery indicator according to the prior art.

Referring now to FIG. 2, there is shown a schematic diagram of a voltage source 12 and low battery indicator 24, which is a prior art battery pack 10. The voltage source 12 provides an operating potential of approximately 3 volts at terminal A, which operating potential operates the night vision goggles 1 via lead 5. A double-throw, four-pole switch 14 couples either a primary battery B1 or a secondary battery B2 to the first terminal A. The voltage source 12 can also remove battery power and supply power from the aircraft. Aircraft power is supplied on a fourth conductor 16, which is coupled to the first conductor 5 by a first diode 18. The controlled current path of a first PNP transistor 22 is coupled between the switch 14 and the first terminal A, and the base electrode of the transistor 22 is coupled to the fourth conductor 16 through a second diode 20. When the aircraft supplies the voltage to terminal A via the fourth conductor 16, the first transistor 22 is biased off, and either the primary or secondary battery B1 or B2 is decoupled from the first terminal A. The voltage on lead 16 is positive for the PNP transistor 22 and causes diode 20 to conduct from anode to cathode to thus turn transistor 22 OFF when lead 16 is positive.

The voltage source 12 also supplies operating potential to a low battery indicator 24, which indicates when the voltage at terminal A is at a low level. A third diode 26 has the anode electrode coupled to terminal A and further coupled to reference potential via resistors 36 and 38. A diode 28 has the anode electrode connected to terminals of the switch 14 for receiving either the B1 or B2 battery voltage, depending upon the setting of the switch. The cathode electrodes of diodes 26 and 28 are connected together with the common connection directed to terminal B(6). The battery B1 or B2 as selected by switch 14 and which is coupled to the anode of the fourth diode 28 supplies voltage to the low battery indicator 24 at terminal B. Capacitors 30 and 32 filter the input voltage. The diodes 26 and 28 allow voltage from the batteries B1 and B2 as well as the aircraft voltage on lead 16 to be monitored and if any selected voltage is low the low battery indicator will provide an output.

The low level battery indicator 24 includes a voltage comparator, such as a 7665 integrated circuit 34 manufactured by Intersil. The voltage supplied to terminal A is sampled by divider resistors R1 and R2 and compared to a reference voltage by the integrated circuit 34. When the sampled voltage drops below 2.4 VDC, the integrated circuit 34 connects pin 7, which is connected to a third terminal C, to pin 4, which is connected to a reference potential. Thus, when the voltage drops below 2.4 volts terminal C is connected to the reference potential. As will be discussed hereinafter, apparatus is connected to terminals B and C to signal to the operator that the voltage at terminal A is at a low level.

In prior art battery packs, voltage is supplied to the night vision goggles by connecting the first conductor 5 to terminal A, and the LED 4 is connected to the low battery indicator by coupling the second and third conductors 5 and 6 to the second and third terminals B and C, respectively. As previously noted, when the night vision goggles system is subjected to high electromagnetic fields, such as 200 V/m and higher, at RF frequencies, the first, second and third conductors 5, 6 and 7 pick up the RF signals and transmit them to the battery pack 10. Unless stopped, these RF signals would interfere with the operation of the voltage source 12 and low battery indicator 24. The voltage source 12 would be affected primarily by the RF signals picked up by the first conductor 5. The first and second diodes 18 and 20, which pass RF signals in both directions, would demodulate the RF signal picked up by the first conductor 5. The RF signals would then be passed by the first diode 18, and then the second diode 20, whereby the transistor 22 would be biased off, and the primary or secondary battery B1 or B2 would be decoupled from conductor 5. If the night vision goggles were under battery power, the night vision goggles would be turned off. Thus, the RF signals picked up by the first conductor 5 would turn off the goggle system.

The low battery circuit 24 would be affected primarily by the RF signals picked up on the second and third conductors 6 and 7. Power intercepted by the conductors depends on their length and orientation in the RF field. At some frequencies and orientations power in excess of 15 watts is possible. Fortunately it is not normally possible to get optimum orientation and power below 15 watts is more normal. Power in excess of 15 watts would cause the integrated circuit 34, the third and fourth diodes 26 and 28 and the LED 4 to burn out almost immediately upon application of the RF power.

Figure 3:
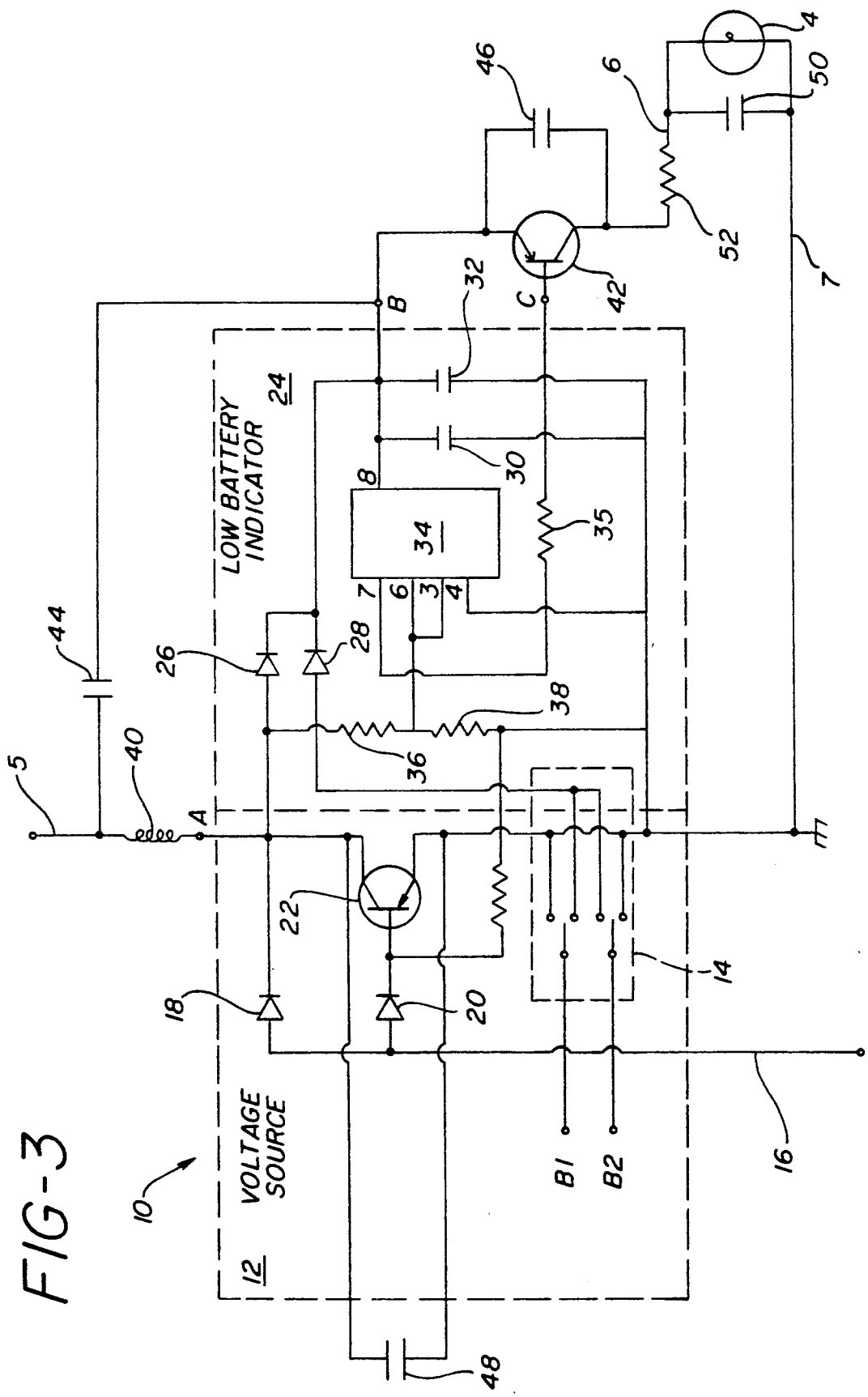
FIG. 3 is a schematic diagram of an exemplary embodiment of the battery pack, which includes a shunt circuit, in accordance with the present invention.

With reference to FIG. 3, and in accordance with the present invention, these RF signals are prevented from interfering with the operation of the voltage source 12 and low battery indicator 24 by providing the voltage source 12 and low battery indicator 24 with a shunt circuit. The shunt circuit includes an inductor 40, a second transistor 42, third, fourth, fifth and sixth capacitors 44, 46, 48 and 50, and a third resistor 52. The inductor 40 is coupled between the first conductor 5 and terminal A. The third capacitor 44 is connected between the first conductor 5 and terminal B. The second transistor 42 has its base connected to pin 7 of the integrated circuit via a resistor 35 and its controlled current path connected between terminal B and one terminal of the third resistor 52. The second conductor 6 is connected to the other terminal of the third resistor 52. The third conductor 7 is coupled to the reference potential. The capacitor 48 is coupled between the collector and emitter of the first transistor 22. The capacitor 46 is coupled between the collector and emitter of the second transistor 42. The sixth capacitor 50 is coupled across the LED 4.

The voltage source 12 is protected as follows. The RF signals picked up by the first conductor 5 are blocked by the inductor 40 and are shunted through a path formed by the third, fourth and sixth capacitors 44, 46 and 50 and the third resistor 52. In the absence of an effective ground plane, the electromagnetic energy is dissipated by the third resistor 52.

The low battery voltage indicator 24 is protected because the second and third conductors 6 and 7 are isolated by the second transistor 42. When the second and third conductors 6 and 7 pick up RF signals, the signals are shunted through a path formed by the first, fourth and sixth capacitors 30, 46 and 50 and the third resistor 52. The electromagnetic energy is dissipated by the third resistor 52. Since the second conductor 6 is not connected to pin 7, as it is in the prior art, the integrated circuit 34 is protected from the RF signals. Thus, when pin 7 is connected to the reference potential to indicate a low battery voltage, transistor 42 is biased on. The DC voltage provided at pin 8 is connected to a path formed by the controlled current path of the second transistor 42, the resistor R4 and the LED. As a result, the LED is illuminated. Thus, the LED can be illuminated without exposing the integrated circuit 34 to RF signals.

The LED is protected from RF signals by the sixth capacitor 50. If the second or third conductors 6 or 7 pick up any RF signals, the sixth capacitor 50 causes these RF signals to bypass the LED.

The third resistor 52 must dissipate the electromagnetic energy of the shunted RF signals. Thus an appropriate power rating and resistance for the third resistor 52 must be selected. If the cable route or length is altered it may be necessary to increase the resistor wattage to compensate for these changes. Further, the first, third, fourth, fifth and sixth capacitors 30, 44, 46, 48 and 50, which pass the shunted RF signals, must have voltage ratings sufficient to withstand the high voltages. For instance, a power rating of 2 watts and a resistance of 150 ohms is selected for the third resistor 52; and a capacitance of 0.001 microfarads and a voltage rating of 100 WVDC are selected for the first, third, fourth, fifth and sixth capacitors 30, 44, 46, 48 and 50. However, these design parameters can be varied by a person skilled in the art.

Referring now to FIG. 4, there is shown an alternate embodiment of a shunt circuit in accordance with the present invention. More specifically, the shunt circuit has been modified such that the LED 104 pulsates. The pulsating LED 104 improves visibility to an operator. Reference numerals of the elements in FIG. 3 that correspond to the elements in FIG. 2 have been increased by one hundred. A flasher unit. such as a 555 timer 154, is employed to make the LED 104 pulsate. The 555 timer is a conventional integrated circuit supplied by many vendors such as Intersil. Pin 8 of the 555 timer 154 is connected to terminal B, and pin 1 is connected to terminal C. The base of the second transistor 142 is connected to pin 3 of the 555 timer 154 via a resistor 135. The pulse period of the LED 104 is determined by an external resistor 156 and an external capacitor 158. A detailed description of the 555 timer 154 is not provided since its operation and application are well known to those skilled in the art.

It will be understood that the embodiments described herein are merely exemplary and that a person skilled in the art may make many variations and modifications without departing from the spirit and scope of the invention. For instance, the shunt circuit can be used to protect voltage source and/or low battery indicator other than that shown in FIG. 2. All such modifications are intended to be included within the scope of the invention as defined in the appended claims.

We claim:

1. In a battery pack for night vision goggles that are employed in the cockpit of an aircraft, where RF fields of several hundred volts/meter can be present, the battery pack having at least one external lead that picks up RF signals, but not having an effective ground plane, the improvement comprising shunt means for shunting RF signals picked up by said at least one external lead, said shunt means having an input coupled to said at least one external lead; and dissipating means, having a resistive component, coupled to an output of said shunt means, for dissipating electromagnetic energy of the RF signals provided on said output of said shunt means.

2. A battery pack according to claim 1, wherein said battery pack includes a first output for providing an operating potential, wherein one of said external leads includes a first external lead for providing said operating potential to the night vision goggles, and wherein said shunt means includes an inductance, coupled between said first output and said first external lead, and a capacitance, coupled between said first external lead and an input of said dissipating means, said inductance functioning to block an RF signal from entering said first output of said battery pack and said capacitance functioning to shunt said RF signal to said dissipating means.

3. A battery pack according to claim 1, wherein the night vision goggles includes means for notifying an operator, wherein said battery pack further includes a first output for providing an operating potential, and means for actuating said notifying means, wherein said at least one external lead includes a first external lead for coupling a first terminal of said notifying means to a first terminal of said dissipating means and a second external lead for coupling a second terminal of said notifying means to said reference potential, and wherein said shunt means includes transistor means having its controlled current path connected between said first output of said battery pack and a second terminal of said dissipating means, and its base connected to an output of said actuating means, such that said transistor means is conductive when said actuating means is actuated.

4. A battery pack according to claim 3, wherein said shunt means further includes a first capacitance, coupled across said first and second external leads, for shunting RF signals that are picked up by said first and second external leads, whereby said RF signals bypass said notifying means.

5. A battery pack according to claim 4, wherein an input of said actuating means is connected to said reference potential and said output of said actuating means is connected to said input when said actuating means is actuated, and wherein said transistor means is a bipolar PNP transistor, whereby said transistor conducts along its said controlled current path when its said base is connected to said reference potential.

6. A battery pack according to claim 4, wherein said shunt means further includes a second capacitance coupled across said controlled current path of said transistor means.

7. A battery pack according to claim 6, further including voltage means for providing a voltage to the night vision goggles, wherein said actuating means is a low battery indicator, responsive to said voltage means, for indicating when said voltage provided by said voltage means is below a reference voltage, whereby said low battery indicator is actuated when said voltage provided by said voltage means is below said reference voltage.

8. A battery pack according to claim 7, wherein said notifying means is an LED.

9. A battery pack according to claim 8, wherein said low battery indicator further includes means, coupled to said base of said transistor means, for pulsating said LED.

10. A battery pack according to claim 1, further including a first output for providing a first operating potential and a second output for providing a second operating potential, and low battery indicator means for determining when said operating potential provided at said first output is at a low level, wherein said night vision goggles includes an LED, wherein said at least one external lead includes a first external lead for providing said operating potential to said night vision goggles, a second external lead for coupling a first terminal of said resistor to a first terminal of said LED and a third external lead for coupling a second terminal of said LED to a reference potential, and wherein said shunt means includes an inductance, coupled between said first output of said battery pack and said first external lead, said inductance functioning to block an RF signal from entering said first output; a first capacitance, coupled between said first external lead and said second output, said capacitance functioning to shunt said RF signal; transistor means having its current controlled path connected between said second output and a second terminal of said resistor and its base being responsive to an output of said low battery indicator means; a second capacitance connected across said controlled current path of said transistor means for shunting said RF signals; and a third capacitance coupled across said second and third external leads for shunting RF signals.

11. A battery pack for night vision goggles, comprising:
voltage means, for providing a first operating potential on a first output and a second operating potential on a second output;
low battery indicator means, responsive to said first output of said voltage means, for determining when said operating potential provided by said first output of said voltage means is at a low level, said low battery indicator means including a voltage comparator having a first input coupled to said first output of said battery means, a second input coupled to a source that provides a reference voltage, a third input coupled to a reference potential, and an output that is coupled to said third input when said voltage at said first input of said voltage comparator is less than said reference voltage at said second input of said voltage comparator;

an LED mounted on the night vision goggles;

external leads coupling said battery pack to said night vision goggles, including a first external lead for providing said first operating potential to said night vision goggles, a second external lead connected to a first terminal of said LED, and a third external lead coupling a second terminal of said LED to said reference potential;

a resistor that dissipates electromagnetic energy provided by RF signals picked up by said external leads, said resistor having a first terminal that is coupled to said first terminal of said LED by said second external lead; and shunt means for shunting RF signals, including
an inductance, coupled between said first output of said voltage means and said first external lead, said inductance functioning to block said RF signals from entering said first output of said voltage means,
a first capacitance, coupled between said first external lead and said second output of said voltage means, for shunting said RF signal,
transistor means having its current controlled path connected between said second output of said voltage means and a second terminal of said resistor, and having its base responsive to an output of said low battery indicator means,
a second capacitance, coupled across said controlled current path of said transistor means, for shunting said RF signals, and
a third capacitance, coupled across said second and third external leads, for shunting said RF signals.

12. A battery pack according to claim 11, wherein said transistor means is a PNP transistor.

13. A battery pack according to claim 12, wherein low battery indicator further includes means, coupled to said base of said PNP transistor, for pulsating said LED.

14. A battery pack according to claim 11, wherein said voltage means includes first and second batteries and first switching means for connecting one battery between said first output and said reference potential and for coupling said other battery between said second output and said reference potential.

15. A battery pack according to claim 14, wherein said night vision goggles are used in the cockpit of an aircraft, where electromagnetic fields of several hundred volts/meter are present, wherein said aircraft provides a source of operating potential to said voltage means on a fourth external lead and wherein said voltage means further includes means for coupling s id fourth external lead to said first output and second switching means, coupled between said first switching means and said first output of said voltage means, for decoupling either said first or second battery from said first output when said aircraft provides said source of operating potential.

* * * * *